Inventor
Horace A. McDaniel
By Talbert Parker
Attorneys

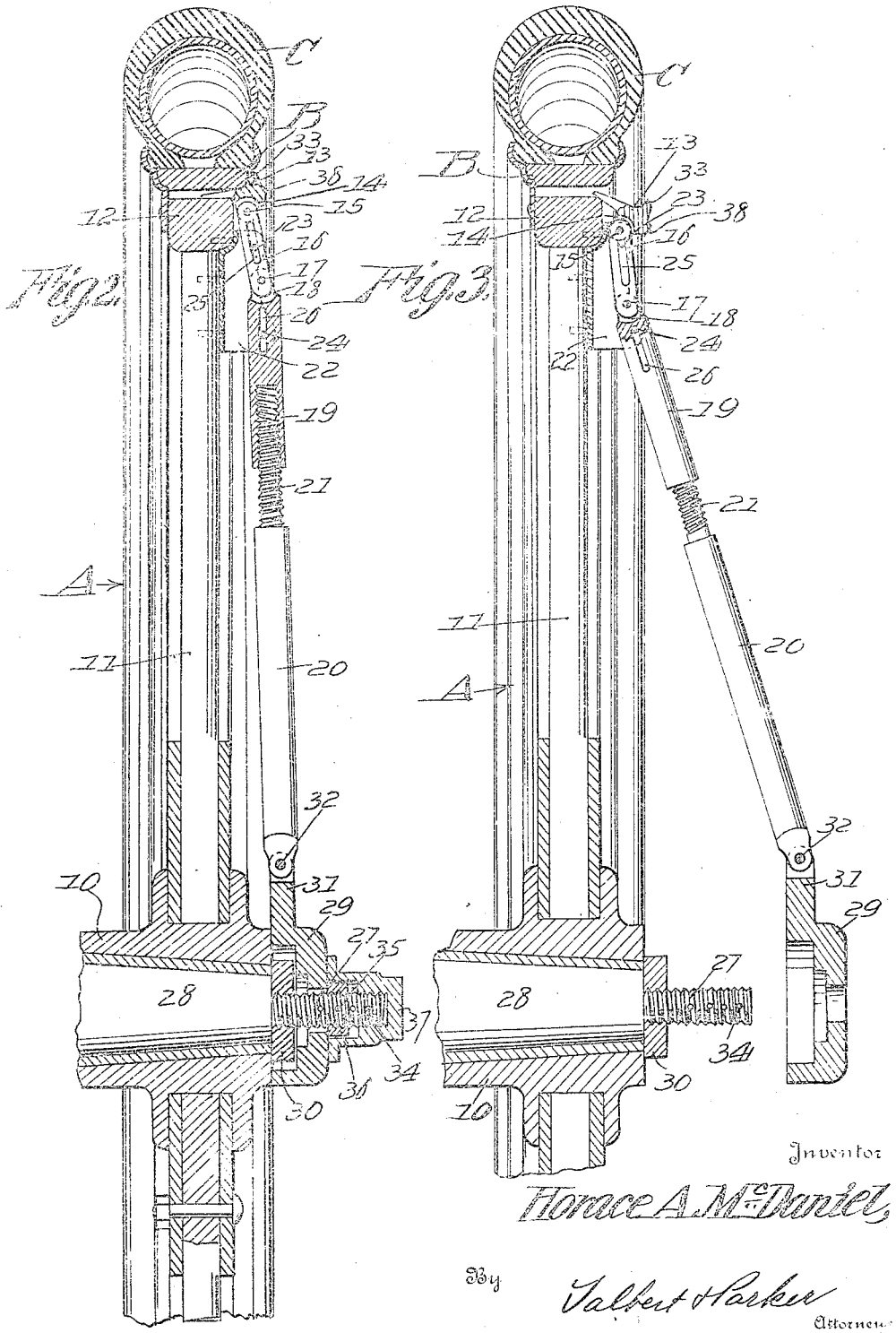

UNITED STATES PATENT OFFICE.

HORACE A. McDANIEL, OF BALTIMORE, MARYLAND.

DEMOUNTABLE-RIM LOCK.

1,278,699.

Specification of Letters Patent.

Patented Sept. 10, 1918.

Application filed April 27, 1917. Serial No. 164,926.

*To all whom it may concern:*

Be it known that I, HORACE A. McDANIEL, a citizen of the United States, residing at Baltimore, in the county of Baltimore and State of Maryland, have invented certain useful Improvements in Demountable-Rim Locks, of which the following is a specification, reference being had therein to the accompanying drawing.

The invention relates to a wheel rim lock and more particularly to the class of locks for use with demountable rims on automobile wheels.

The primary object of the invention is the provision of a lock of this character wherein a plurality of wedge keys are operated from a common point simultaneously so as to securely fasten the demountable rim upon the felly of the wheel or to release said rim with despatch so that it can be removed from the felly when the occasion requires, thus eliminating the necessity of manually securing or detaching a series of clamps as are ordinarily employed in the fastening of a demountable rim upon the wheel.

Another object of the invention is the provision of a lock of this character wherein the same is supported upon the wheel and constitutes a part thereof so that in a single operation the novel wedge keys can be automatically actuated simultaneously for the fastening or unfastening of the demountable rim carried by said wheel, each key being designed to serve as an abutment for the outer edge of the rim to avoid any possibility of the outward displacement of said rim when subjected to lateral thrusts or vibrations.

A further object of the invention is the provision of a wheel rim lock of this character wherein the same is adjustable for the mounting thereof upon different sizes of wheels, whereby in the use of said lock it will securely fasten the demountable rim upon the felly of the wheel.

A still further object of the invention is the provision of a lock of this character wherein the construction thereof is novel in form to assure the positive operation of the same and the quick and convenient fastening and unfastening of the automobile rim upon the wheel without excessive labor.

A still further object of the invention is the provision of a lock of this character which is simple in construction, readily and easily applied to and removed from a wheel, thoroughly reliable and efficient in its operation, strong, durable and inexpensive in manufacture.

With these and other objects in view the invention consists in the features of construction, combination and arrangement of parts as will be hereinafter fully described, illustrated in the accompanying drawings and pointed out in the claims hereunto appended.

In the accompanying drawings:

Fig. 2 is an enlarged fragmentary vertical transverse sectional view through the wheel and rim showing the lock in position for fastening the demountable rim on the felly of the wheel;

Fig. 3 is a view similar to Fig. 2 showing the lock in released position;

Similar reference characters indicate corresponding parts throughout the several views in the drawings.

Figure 1:
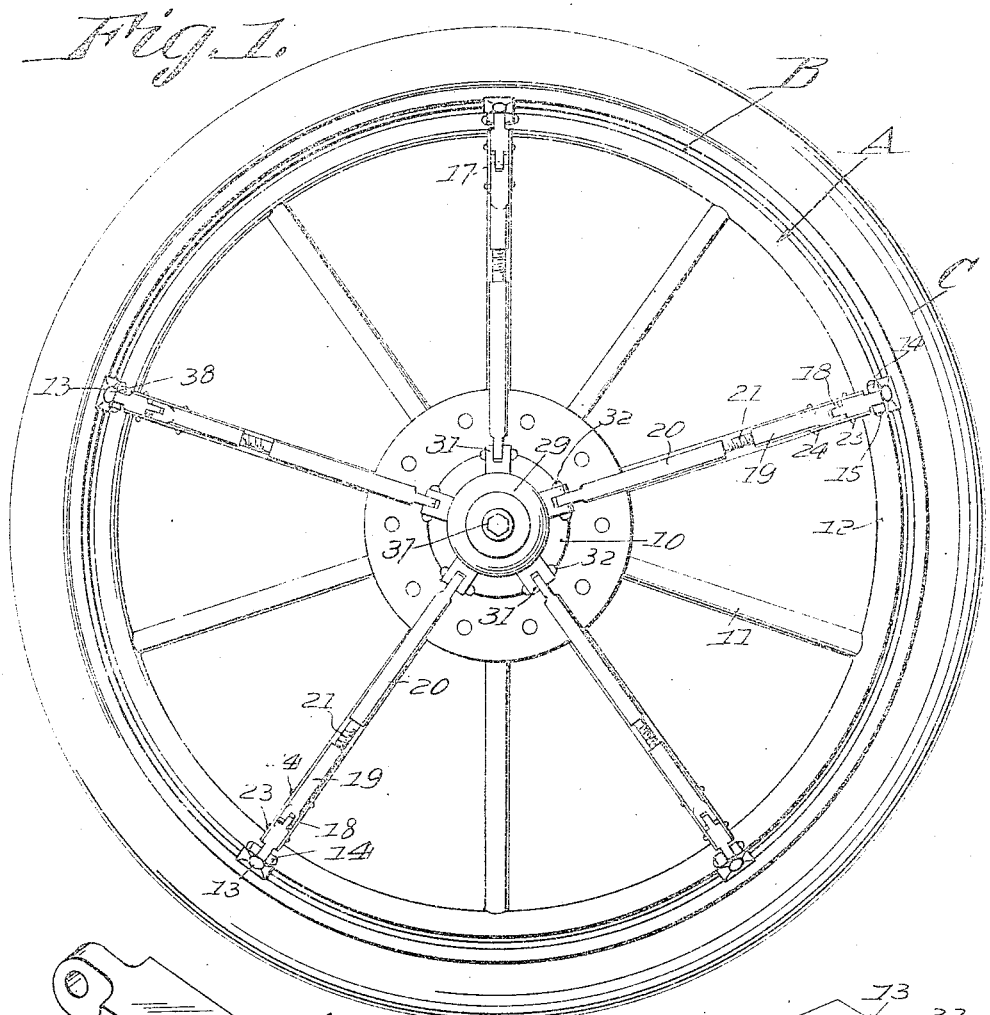
Figure 1 is a side elevation of a wheel with the demountable rim showing the lock constructed in accordance with the invention applied thereto.
Figure 4:
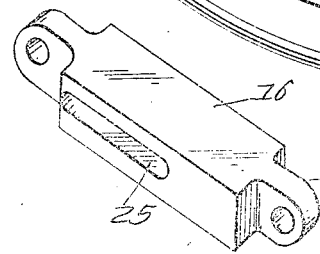
Fig. 4 is a perspective view of one of the links of the lock.
Figure 5:
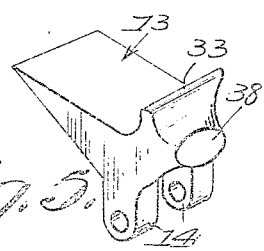
Fig. 5 is a perspective view of one of the wedge keys.
Figure 6:
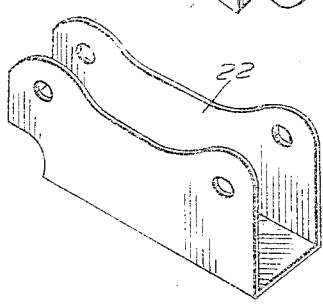
Fig. 6 is a perspective view of one of the brackets for the lock.

Referring to the drawing in detail A designates generally an automobile wheel which includes the hub 10, spokes 11 and felly 12, while B is the demountable rim supported upon the felly 12 as usual and carries the usual pneumatic tire C which is fastened thereon in the ordinary well known manner. The lock for the demountable rim B comprises a plurality of wedging keys 13 which are adapted to be forced inwardly between the felly 12 and the demountable rim B for the secure fastening of the latter upon said felly of the wheel. Each key 13 is formed with spaced ears 14 in which is engaged a pivot 15 swingingly connecting thereby one end of a link 16 which at its opposite end is connected through the medium of a pivot 17 between spaced ears 18 formed on the outer section 19 of an adjustable actuating rod, the inner section 20 of which is formed with a threaded end 21 tapped into the section 19 and in this manner the length of the rod can be varied in the mounting of the lock on various sizes of wheels.

On certain of the spokes 11 of the wheel A are brackets each in the form of a U-shaped member 22 and in which are mounted spaced transversely disposed guide and fulcrum pins 23 and 24 respectively, the point 23 being passed through an elongated slot 25 formed longitudinally and transversely in the link 16 while the pin 24 is passed through an elongated slot 26 formed longitudinally and transversely in the outer section 19 of the actuating rod so that the link and rod are free for displacement on the pins 23 and 24 and also are capable of rocking movement thereon for a purpose presently to be described.

Removably fitted on the outer reduced threaded nut engaging end 27 of the axle spindle 28 for the hub 10 of the wheel A is a cap-like spider 29 which accommodates and conceals the axle nut 30 which is engaged on the end 27 of the spindle 28 as usual and the radially disposed bifurcated ears 31 of this spider 29 have pivoted at 32 therein the inner ends of the sections 20 of the actuating rods so that on positioning the spider 29 upon the end 27 of the spindle 28 the actuating rods 20 will be moved and the link 16 simultaneously moved therewith for forcing the wedge keys 13 into position between the felly 12 and the demountable rim B for the fastening of said rim upon the felly of the wheel. Each wedging key 13 is formed with an abutment shoulder 33 against which bears the outer edge of the demountable rim B when the key 13 is in position for fastening the rim upon the felly so as to avoid any displacement of the rim B resultant from outward lateral thrust or vibrations in the use of the wheel.

Formed at intervals transversely in the threaded end 27 of the spindle 28 are spaced pin receiving holes 34 for receiving a locking pin 35 which fastens securely upon the end 27 a retaining nut 36 for the spider 29 and in this manner the nut 36 is prevented from working off of the end 27 when engaged thereon for securing the spider 29 in place thereon.

On the outer extremity of the end 27 of the spindle 28 is a cap nut 37 of any approved type which conceals therein the nut 36 for retaining the spider upon the spindle end.

Each wedge key 13 at its outer end is formed with a striking head 38 which permits the striking of the same with a hammer or other tool in event that it is necessary to snugly drive or force the wedge keys 13 between the felly 12 and the demountable rim B for the firm and secure fastening of said demountable rim upon the wheel.

In the operation of the lock when the demountable rim B is upon the wheel, it being assumed that the wedge keys 13 have been engaged between the felly 12 and said rim B and it is desired to remove the demountable rim, the spider 29 is disengaged from the end 27 of the spindle 28 by removing the cap 37 and the nut 36 and on pulling outwardly upon the spider the actuating rods including the sections 19 and 20 are rocked and displaced to move the links 25 which in their movement withdraw the wedge keys 13 from between the felly 12 and the demountable rim B so that the latter can be readily taken off of the wheel as will be apparent from Fig. 3 of the drawings without necessitating the removal of the wheel A from the spindle 28.

On mounting the demountable rim upon the felly 12 of the wheel and replacing the spider 29, nut 36 and cap 37 upon the end 27 of the spindle 28 the wedge keys 13 will be forced between the felly 12 and the rim B to securely fasten the rim upon said felly of the wheel as is clearly shown in Fig. 2 of the drawings.

In event that the wedge keys 13 will not enter between the felly 12 and the rim B a hammer or other tool can be used and by striking the heads 38 of said keys the same will be forced into position, or it may be that after the spider 29 has been placed on the end 27 of the spindle that the keys 13 are loose and by tapping the striking heads 38 with a hammer or other tool the same can be further forced into position for the secure mounting of the demountable rim on the felly of the wheel.

When it is desired to lengthen or shorten the actuating members including the sections 19 and 20 the said section 20 is disengaged from the spider by removing the pivot 32 from the ear 31 on said spider and upon turning the section 20 the threaded end 21 thereof will be worked inwardly of or outwardly from the section 19 thus varying the length of the actuating rod to permit the mounting of the lock on different sizes of automobile wheels. It is to be understood that changes, variations and modifications may be made in the invention such as come properly within the scope of the appended claims without departing from the spirit of the invention or sacrificing any of its advantages.

From the foregoing it is thought that the construction and manner of operation of the device will be clearly understood and therefore a more extended explanation has been omitted.

What is claimed is:

1. The combination with a wheel having a felly and demountable rim thereon, of a lock comprising a plurality of wedging keys for engagement between the felly and the rim, and means adjacent the axis of the wheel for detachable engagement with the latter and connected with the keys for simultaneously moving the same into locking or unlocking position.

2. The combination with a wheel having a felly and demountable rim thereon of a lock comprising a plurality of wedging keys insertible between the felly and rim, actuating rods adapted to be fulcrumed upon the wheel and having link connection with the keys for moving the same between the felly and rim and away from the same, and a spider adapted for detachable connection with the spindle for the wheel and pivotally connected with the actuating rods for moving the same simultaneously on the engagement of the spider on and from the spindle.

3. The combination with a wheel having a felly and demountable rim thereon of a lock comprising a plurality of wedging keys insertible between the felly and rim, actuating rods adapted to be fulcrumed upon the wheel and having link connection with the keys for moving the same between the felly and rim and away from the same, a spider adapted for detachable connection with the actuating rods for moving the same simultaneously on the engagement of the spider on and from the spindle, and abutment shoulders on the keys for engagement with the outer edge of the demountable rim.

4. The combination with a wheel having a felly and demountable rim thereon of a lock comprising a plurality of wedging keys insertible between the felly and rim, actuating rods adapted to be fulcrumed upon the wheel and having link connection with the keys for moving the same between the felly and rim and away from the same, a spider adapted for detachable connection with the actuating rods for moving the same simultaneously on the engagement of the spider on and from the spindle, abutment shoulders on the keys for engagement with the outer edge of the demountable rim, and means for detachably fastening the spider upon the spindle.

5. The combination with a wheel having a felly and demountable rim thereon of a lock comprising a plurality of wedging keys insertible between the felly and rim, actuating rods adapted to be fulcrumed upon the wheel and having link connection with the keys for moving the same between the felly and rim and away from the same, a spider adapted for detachable connection with the actuating rods for moving the same simultaneously on the engagement of the spider on and from the spindle, abutment shoulders on the keys for engagement with the outer edge of the demountable rim, means for detachably fastening the spider upon the spindle, and means for lengthening and shortening the actuating rods.

In testimony whereof I affix my signature.

HORACE A. McDANIEL.